United States Patent [19]

Bailey

[11] 4,126,436
[45] Nov. 21, 1978

[54] APPARATUS FOR MINIMIZING DRAWN FILAMENT DIAMETER VARIATION

[75] Inventor: Alan C. Bailey, Horseheads, N.Y.

[73] Assignee: Corning Glass Works, Corning, N.Y.

[21] Appl. No.: 857,418

[22] Filed: Dec. 5, 1977

[51] Int. Cl.² .................................................. C03B 37/02
[52] U.S. Cl. .................................................. 65/13; 65/2; 65/32; 425/66
[58] Field of Search ................... 65/2, 11 W, 12, 13, 65/32

[56] References Cited

U.S. PATENT DOCUMENTS

| 2,958,899 | 11/1960 | Stein et al. | 65/13 X |
| 3,737,292 | 6/1973 | Keck et al. | 65/13 X |
| 3,890,127 | 6/1975 | Siegmund | 65/13 X |
| 4,030,901 | 6/1977 | Kaiser | 65/2 |

Primary Examiner—Robert L. Lindsay, Jr.
Attorney, Agent, or Firm—William J. Simmons, Jr.; Walter S. Zebrowski; Clarence R. Patty, Jr.

[57] ABSTRACT

An apparatus is disclosed for drawing glass optical waveguide filaments having minimal diameter variation. A draw blank is supported within an elongated, heated, tubular muffle which heats the blank to its draw temperature. Gas is supplied to that end of the muffle opposite that from which the filament is drawn. A cylindrically shaped member at least 10 cm long is disposed adjacent to the end of the blank opposite the filament to form with the inner wall of the muffle a thin, cylindrically-shaped channel through which the gas must flow. The gas stream is thus uniformly heated at the time that it reaches the root of the filament so that diameter variations due to gas turbulence are minimized.

6 Claims, 6 Drawing Figures

APPARATUS FOR MINIMIZING DRAWN FILAMENT DIAMETER VARIATION

BACKGROUND OF THE INVENTION

This invention relates to an improved apparatus for drawing glass optical waveguide filaments minimal diameter variation.

Optical waveguide filaments are a promising transmission medium recently developed for use in optical communication systems. Because of optical characteristics including but not necessarily limited to purity of materials and lack of light scattering mechanisms, e.g. core-cladding interface imperfections, low-loss light propagation over long distances is now possible. Optical waveguides suitable for use in optical communication systems can be formed by method such as those disclosed in U.S. Pat. Nos. Re. 28,029 issued to D. B. Keck et al. and 3,823,995 issued to L. L. Carpenter.

It has been found that during the process of drawing certain optical waveguide filaments, diameter variations increased in magnitude after a portion of the draw blank had been drawn even when diameter monitoring and control apparatus was employed. While drawing filament from a blank capable of providing more than about 4 km of filament, the variation in filament diameter typically increased from about $\pm 1$ $\mu$m during the drawing of the first section of filament from the blank to about $\pm 3$ $\mu$m by the time the last km of filament was being drawn. More specifically, little or no increase in diameter change would occur until about 10 cm of blank remained. Thereafter, as the blank decreased in size below about 10 cm, the diameter variation would continue to increase to a maximum of about $\pm 3$ $\mu$m.

For various reasons it is desirable to maintain the diameter of optical waveguide filaments as close as possible to a predetermined value. As discussed in the publication "Mode-Dependent Attenuation of Optical Fibers: Excess Loss" by R. Olshansky et al., *Applied Optics*, Vol. 15, p. 1045–1047, April, 1976, diameter variations have been found to produce losses in optical waveguides. Moreover, when the ends of two optical waveguides are coupled together, the diameters thereof should be substantially the same to maximize the coupling of light therebetween.

SUMMARY OF THE INVENTION

It is therefore an object of the present invention to provide an apparatus for forming optical waveguide filaments having minimal diameter variation.

A further object is to provide an improved apparatus for drawing optical filaments.

Briefly, the present invention pertains to an apparatus for drawing a cylindrically shaped blank of thermoplastic material into a filament. Such apparatus conventionally comprises an elongated, cylindrically shaped muffle having first and second ends, means being provided within the muffle for supporting the blank in the muffle with such an orientation that the filament is drawn from the first end thereof. Means is provided for heating the muffle in the vicinity of the blank so that the blank is heated to the drawing temperature thereof. The second end of the muffle is sealed, and means is provided for introducing a gas into the second end of the muffle, the gas thereafter flowing through the muffle and exhausting from the first end. In accordance with the present invention, means is disposed in the muffle immediately adjacent the blank and on that side of the blank toward the second end of the muffle for confining the flow of the gas to a narrow, cylindrically shaped channel adjacent to the inner wall of the muffle to uniformly heat the gas prior to the time that the gas flows past the blank.

DETAILED DESCRIPTION

Figure 1:
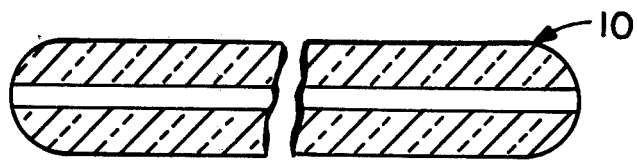
FIG. 1 is a cross-sectional view of an optical waveguide draw blank.

It is to be noted that the drawings are illustrative and symbolic of the present invention and there is no intention to indicate the scale or relative proportions of the elements shown therein. Although the preferred embodiments described herein relate to the drawing of glass optical waveguide filaments, the method of this invention is applicable to the drawing of filaments of other thermoplastic materials.

Figure 2:
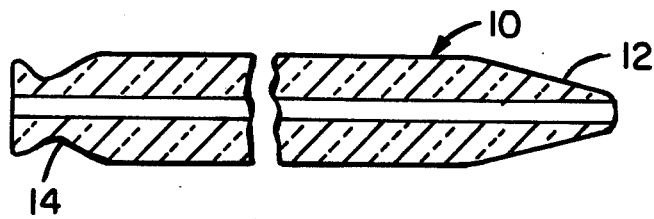
FIG. 2 is a cross-sectional view of a draw blank which has been flameworked in preparation for insertion thereof into a draw furnace.

The present invention will be described in connection with the formation of an optical waveguide filament from a flame hydrolysis-produced blank formed in accordance with the method of the aforementioned U.S. Pat. No. Re. 28,029, although this invention is not intended to be limited to blanks produced in this manner. In accordance with that patent a first coating of glass having a predetermined refractive index is formed on the outside peripheral surface of a substantially cylindrical mandrel. The refractive index of this first coating may be uniform throughout, or it may vary radially in a manner well known in the art. Thereafter, a second coating of glass is applied to the peripheral outside surface of the first coating, the second coating having a preselected index of refraction less than that of the first coating. The mandrel is removed from the assembly following the application of either the first or second coating. The resultant substantially cylindrical hollow assembly or draw blank 10 is illustrated in FIG. 1. As shown in FIG. 2, the ends of blank 10 can be flameworked, one end 12 being tapered to facilitate the starting of the draw and the other end 14 being provided with a neck which fits into the handle.

Figure 3:
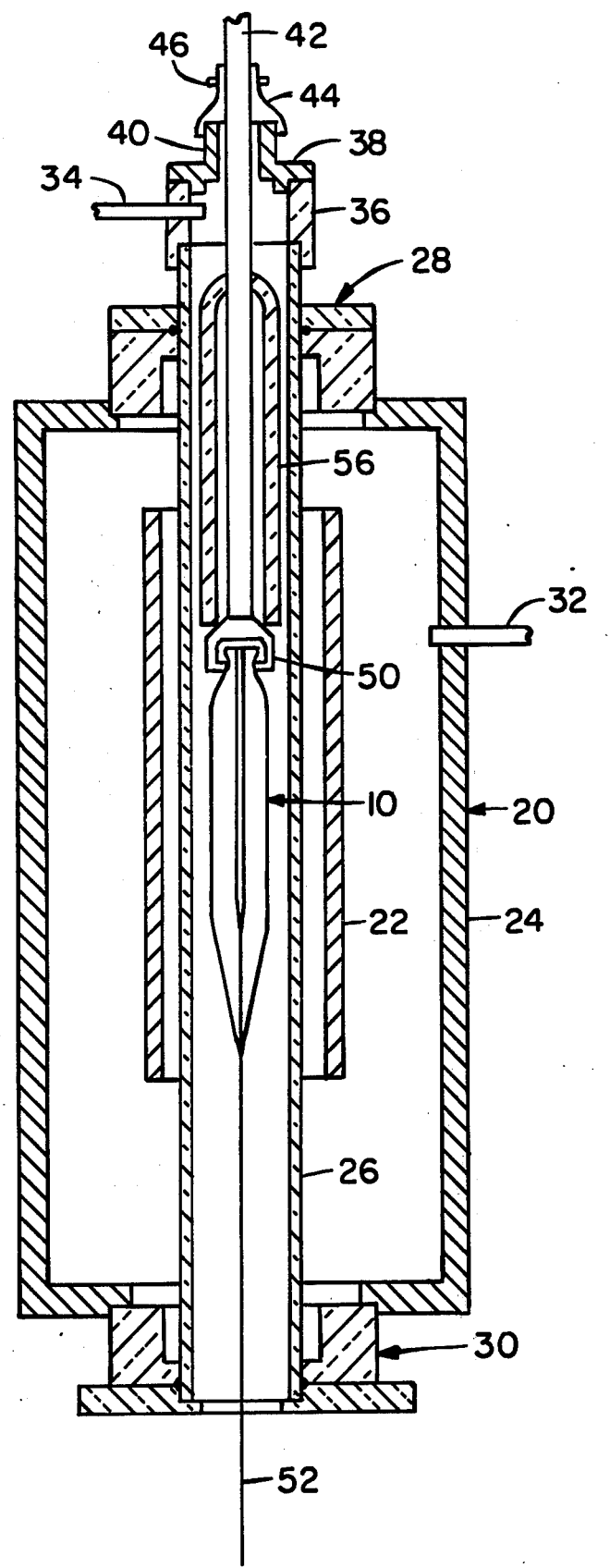
FIG. 3 is a cross-sectional view of a draw furnace suitable for the drawing of optical waveguide filaments. Included is a blank support handle modified in accordance with the present invention.

A typical draw furnace 20 is illustrated in FIG. 3. A resistance heating element 22 is supported by means (not shown) within enclosure 24. Centrally disposed within the furnace is an alumina muffle 26, the ends of which are sealed to enclosure 24 by means 28 and 30. A pipe 32 for supplying an inert gas such as nitrogen extends through enclosure 24. A pipe 34 for supplying gas to muffle 26 extends through annular member 36 which is situated on top of muffle 26. End cap 38, which is sealed to member 36, includes a sleeve 40 through which blank support rod 42 extends. Sealing member 44 of metallic foil surrounds sleeve 40 and the adjacent portion of rod 42, to which it is sealed by O-ring 46.

It has been conventional practice to secure draw blank 10 to rod 42 by any well known means including the slotted glass handle 50 which is illustrated in FIG. 3. During the process of drawing the optical waveguide filament 52, rod 42 slowly descends downwardly through muffle 26 to maintain the root portion of filament 52 and the tapered portion of blank 10 at the proper temperatures for drawing.

While the filament is being drawn, oxygen and nitrogen are introduced through pipe 34 and member 36 into the top of muffle 26. Since this end of the muffle is sealed by members 36, 38, 40 and 44, these gases flow down through the muffle past blank 10 and are exhausted at the bottom of the muffle. These gases are employed to assure oxidation of contaminants in filament 52, to control or eliminate updrafts which would tend to flow up through the heated muffle, and to flush out materials evolving from the heated blank and muffle.

The inside diameter of muffle 26 has conventionally been made sufficiently large as compared to the outside diameter of blank 10 that no portion of the blank can touch the muffle. Oxygen and nitrogen supplied to member 36 are heated while flowing down through the annular channel between muffle 26 and blank 10. Heretofore, it was only the unconsumed blank which forced these gases to flow in the narrow channel adjacent to the hot muffle to be heated. As long as the length of the blank was greater than about 10 cm these gases could be uniformly heated so that they would not greatly affect the diameter of the filament being drawn. However, as the blank was consumed, the gases could not be heated as uniformly, and the thermal gradients and resultant turbulence at the tip of the blank caused filament diameter variation to increase.

In accordance with the present invention this problem is remedied by lengthening the channel through which the muffle gases must flow prior to reaching the root of the filament. In the embodiment of FIG. 3 this is accomplished by surrounding blank support rod 42 with a glass tube 56 which abuts against the top of handle 50. The end of tube 56 remote from handle 50 is tapered inwardly so that the aperture at that end of the tube is just large enough to permit the tube to be slipped over rod 42. The presence of tube 56 causes the oxygen and nitrogen to flow through a narrow channel near the inner surface of muffle 26 for a sufficient distance to uniformly heat these gases even after most of the blank is consumed. With the addition of tube 56, substantially no change in filament diameter occurs during the drawing of the entire blank provided that the combined length of tube 56 and handle 50 is at least about 10 cm.

Figure 4:
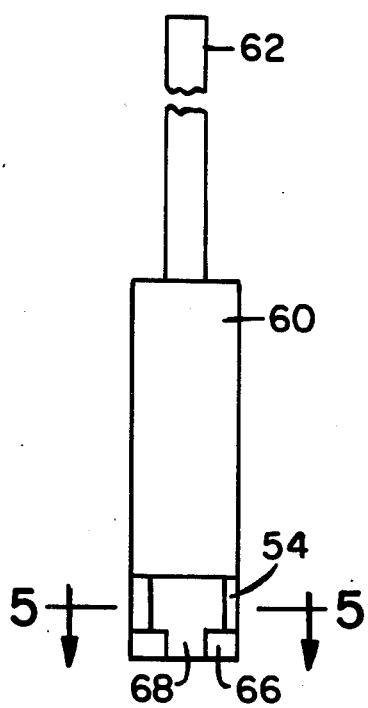
FIG. 4 illustrates another embodiment of the present invention.
Figure 5:
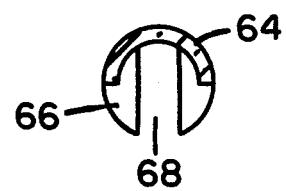
FIG. 5 is a cross-sectional view taken along lines 5—5 of FIG. 4.

Another embodiment of this invention is illustrated in FIGS. 4 and 5. In this embodiment handle 60, which is attached to blank support rod 62, is elongated to a minimum length of about 10 cm so that it provides the same function as the combination of handle 50 and tube 56 of the previously described embodiment. Although the cross-sectional view of FIG. 5 is indicated as being taken at lines 5—5 of FIG. 4, it is identical to the cross section of handle 50 of FIG. 3. Semi-circular wall 64 supports an annular disc 66 having a slot 68 therein. Draw blank 10 is suspended from this handle by inserting neck 14 into slot 68.

EXAMPLES

Five optical waveguide draw blanks hereinafter referred to as blanks A through E were formed in accordance with the teachings of the aforementioned Keck et al. patent. A first coating of glass soot comprising silica doped with germania and boric oxide was applied to the outside peripheral surface of a mandrel. A second coating of glass soot comprising silica doped with boric oxide was applied to the outside peripheral surface of the first coating. The first coating of blanks A, C and E was formed by applying a plurality of distinct and successive layers of soot, each distinct layer having a substantially uniform composition therethrough but having a progressively different composition from the preceding layer so as to form a structure having a stepped radially varying composition, each successive layer having a refractive index lower than that of the preceding layer. The first applied coating of blanks B and D were substantially homogeneous. After withdrawing the mandrels from the soot preforms, the preforms were sintered or consolidated in a resistance furnace having a helium atmosphere at about 1400° C. Each of the resultant draw blanks A through E had a diameter of about 28 mm.

The blanks were drawn into optical waveguide filaments in a furnace of the type illustrated in FIG. 3. Alumina muffle 26 was 90 cm long, had an inside diameter of 45 mm and an outside diameter of 51 mm. Oxygen and nitrogen each flowed at the rate of 1.0 CFH into pipe 34 and down through muffle 26. Filament 52 was drawn from the tapered portion of draw blank 10 which was heated to a maximum temperature of about 1800° C. The diameter control system was calibrated to provide a filament having an outside diameter of 125 μm. The filament diameter spread and type of handle during the drawing of the optical waveguide filaments from blanks A through E are set forth in Table I.

TABLE

| Blank | Index Profile | Handle | Spread Beg. (μm) | End | km | Spread Beg. (μm) | End | km |
|---|---|---|---|---|---|---|---|---|
| A | Graded | Standard | 1.5 | 3.5 | 8 | | | |
| B | Step | Standard Solid | 1.0 | 1.5 | 6 | 0.8 | 1.5 | 10 |
| C | Graded | Standard Solid | 1.0 | 1.0 | 1 | 1.0 | 1.0 | 10 |
| D | Step | Standard 7" Tube | 2.0 | 3.5 | 4 | 1.0 | 1.0 | 5 |
| E | Graded | 7" Tube | 1.0 | 1.0 | 6 | | | |

Figure 6:
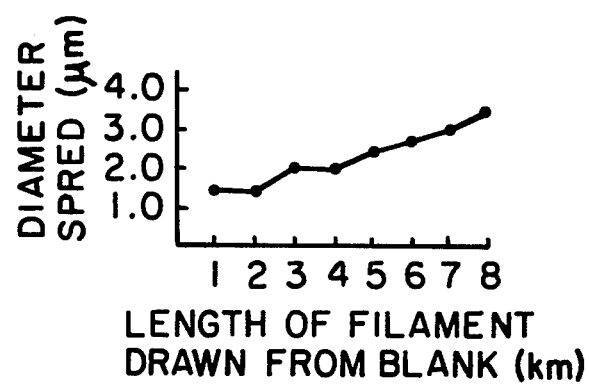
FIG. 6 is a graph illustrating the increase in diameter spread which occurs while utilizing prior art apparatus for drawing filament.

Blank A was supported from a standard prior art handle of the type illustrated in FIG. 1 comprising a quartz handle 50 suspended from a 14 mm diameter glass rod. Handle 50 was 38 mm long and had an outside diameter of 35 mm. Although the diameter control system was functioning during the drawing of the entire filament from blank A, the diameter variation increased from 1.5 μm at the beginning of the draw to about 3.5 μm at the end of the draw. FIG. 6 illustrates the increase in diameter spread as additional filament is drawn from the blank. It can be seen that diameter spread began to increase significantly when 5 km of filament remained to be drawn and continued to increase until the 8th and final kilometer of filament was drawn. Whereas an increase in diameter spread of 0.5 μm occurred during the drawing of the first 4 kilometers, an additional spread of 2 μm occurred during the drawing of the last 4 kilometers. It is possible that the long, relatively large diameter blank forced the muffle gas to flow for a longer distance close to the hot muffle wall resulting in a reduction in thermal gradients in that gas stream as it flowed past the tip of the blank. As the blank was consumed, the gases were not heated as uniformly and thermal gradients at the tip of the blank appeared to cause the diameter variation to increase.

Blanks B and C, which exhibited step and graded index profiles, respectively, were partially drawn while suspended from a conventional handle. Under these conditions, 6 km of filament were drawn from blank B and 1 km was drawn from blank C. As shown in Table I the diameter spread at the beginning of the draw for both Examples B and C as 1.0 $\mu$m. At the end of the 6th kilometer, the diameter spread for blank B had increased to 1.5 $\mu$m. Thereafter, additional filament was drawn from blanks B and C under the same conditions as previously described except that an elongated handle of the type illustrated in FIG. 4 was employed to support the blanks. Whereas the diameter of the elongated handle was 35 mm, the same diameter as the standard handle, the length was increased to 10.2 cm. Table I indicates that the final 4 kilometers of filament drawn from blank B had a diameter of 125 $\mu$m $\pm 0.8$ $\mu$m during the drawing of the 7th kilometer of filament from that blank, the diameter spread increasing to 1.5 $\mu$m during the drawing of the 10th kilometer of filament. The diameter spread of the filament drawn from blank C was constant at 1.0 $\mu$m during the drawing of the last 9 kilometers from that blank.

4 kilometers of filament were drawn from blank D using the standard blank support and drawing equipment illustrated in FIG. 3. The diameter spread increased from 2.0 $\mu$m during drawing of the 1st kilometer of filament to 3.5 $\mu$m during the drawing of the 4th kilometer. With 1 kilometer of filament remaining to be drawn from blank D, the blank was again suspended from handle 50, but during this drawing operation, a 17.8 cm long low expansion glass tube having an outside diameter of 38 mm and a 2 mm wall thickness was inserted over the blank support rod where it was supported by handle 50. The final kilometer of filament drawn from blank D had a diameter variation of only 1.0 $\mu$m. The same 17.8 cm long tube was employed during the drawing of filament from blank E. During the drawing of all 6 kilometers of filament from blank E, the diameter spread remained constant at 1.0 $\mu$m.

From the above discussion of Table I it can be seen that the filament diameter variation will generally increase from about 1.0 to 1.5 $\mu$m to about 3.5 $\mu$m during the drawing of the last 5 kilometers of filament. However, increasing the effective length of the blank supporting handle to at least 10 cm will prevent this increase in diameter variation. The thickness of the channel between the handle and the muffle is preferably between 3 and 4 mm for a 10 cm long handle. If the channel is deeper than 4 mm, the handle should be longer than 10 cm. The tubular adaptor which slides over the blank support rod as shown in FIG. 3 appears to have the same effect as an elongated handle of the type illustrated in FIG. 4. In either case, means are provided for confining the flow of muffle gas through a narrow annular channel at least 10 cm in length immediately adjacent that end of the draw blank opposite the end from which the filament is drawn. Both the solid handle illustrated in FIG. 4 and the tubular sleeve illustrated in FIG. 3 have consistently resulted in the drawing of optical waveguide filaments, the terminal diameter variation of which is at least 50% lower than that which it would have been if a conventional handle were used. In most cases the entire draw blank is drawn into optical waveguide filament with no increase in filament diameter variation during drawing of the entire filament.

I claim:

1. In an apparatus for drawing a cylindrically shaped blank of thermoplastic material into a filament comprising the combination of an elongated, cylindrically shaped muffle having first and second ends, means for supporting said blank in said muffle with such an orientation that said filament is drawn from said first end, means for heating said muffle in the vicinity of said blank so that said blank is heated to the drawing temperature of the material thereof, means for sealing said second end of said muffle, and means for introducing a gas into said second end of said muffle, said gas flowing through said muffle and exhausting from said first end, the improvement comprising means disposed in said muffle immediately adjacent said blank on that side thereof toward said second end of said muffle for confining the flow of said gas to a narrow, cylindrically shaped channel adjacent to the inner wall of said muffle to uniformly heat said gas prior to the time that said gas flows past said blank.

2. The apparatus of claim 1 wherein said means for confining comprises a cylindrically shaped member at least 10 cm in length.

3. The apparatus of claim 2 wherein said means for supporting comprises a cylindrically shaped support rod having a handle disposed within said muffle for supporting an end of said blank, said support rod extending through said means for sealing, said means for confining comprising a cylindrically shaped tube disposed over said support rod and in contact with said handle, the combined length of said tube and said handle being at least 10 cm.

4. The apparatus of claim 2 wherein said means for supporting comprises an elongated cylindrically shaped rod which protrudes through said sealing means and terminates in a handle for securing an end of said blank, the diameter of said handle being at least as large as the diameter of said blank for a length of at least 10 cm to form said means for confining.

5. The apparatus of claim 2 wherein said gas is a mixture of nitrogen and oxygen.

6. The apparatus of claim 2 wherein the thickness of the channel between said muffle and said cylindrically shaped member is between 3 mm and 4 mm.

* * * * *